(12) United States Patent
Kocourek

(10) Patent No.: US 10,072,776 B2
(45) Date of Patent: Sep. 11, 2018

(54) FLUID CONNECTOR WITH ANNULAR GROOVE AND SEAL

(71) Applicant: Deere & Company, Moline, IL (US)

(72) Inventor: Steven R. Kocourek, East Dubuque, IL (US)

(73) Assignee: DEERE & COMPANY, Moline, IL (US)

( * ) Notice: Subject to any disclaimer, the term of this patent is extended or adjusted under 35 U.S.C. 154(b) by 420 days.

(21) Appl. No.: 14/831,404

(22) Filed: Aug. 20, 2015

(65) Prior Publication Data

US 2017/0051852 A1  Feb. 23, 2017

(51) Int. Cl.
*F16L 19/02* (2006.01)
*F16J 15/06* (2006.01)

(52) U.S. Cl.
CPC ......... *F16L 19/0218* (2013.01); *F16J 15/062* (2013.01); *F16L 19/0206* (2013.01)

(58) Field of Classification Search
CPC .................................................. F16L 19/0218
USPC ....................................................... 285/354
See application file for complete search history.

(56) References Cited

U.S. PATENT DOCUMENTS

| | | | |
|---|---|---|---|
| 2,404,409 A | 7/1946 | Smith | |
| 2,783,068 A | 2/1957 | Bloom et al. | |
| 2,876,024 A | 3/1959 | Lorscheidt | |
| 2,886,284 A * | 5/1959 | Wheatley | F16J 15/122 |
| | | | 251/358 |
| 2,892,644 A | 6/1959 | Collins | |
| 3,089,678 A * | 5/1963 | Grove | F16K 3/0227 |
| | | | 251/327 |
| 3,263,961 A | 8/1966 | Varga | |
| 3,472,523 A * | 10/1969 | Carlson, Jr. | F16J 15/024 |
| | | | 277/649 |
| 3,544,119 A | 12/1970 | Glover | |
| 3,575,431 A | 4/1971 | Bryant | |
| 3,558,097 A | 6/1971 | DeFrees | |
| 3,746,348 A | 7/1973 | Stone | |
| 3,758,123 A | 9/1973 | Ksieski | |
| 3,909,017 A | 9/1975 | Engström | |
| 3,910,555 A | 10/1975 | Bertrem et al. | |

(Continued)

FOREIGN PATENT DOCUMENTS

EP        1945985 B1    5/2007

OTHER PUBLICATIONS

Technical Information of Kalrez® Seals (2006) ( 8 pages).

(Continued)

*Primary Examiner* — David Bochna

(57) ABSTRACT

In accordance with an example embodiment, a fluid connector may include an inner face, outer face, annular groove extending below the inner face and the outer face, and annular seal installed in the groove. The groove may include an inner wall, bottom wall, outer wall, and lip. The annular seal, in an undeformed state, may include a first convex surface, a second concave surface, a third convex surface, and a fourth concave surface. The second surface may be positioned radially inward of the first surface and radially outward of the third surface. The third surface may be between the second surface and a fourth surface, radially inward of the first surface. The fourth surface may be positioned radially outward of the third surface and radially inward of the first surface.

20 Claims, 6 Drawing Sheets

(56) References Cited

U.S. PATENT DOCUMENTS

| | | |
|---|---|---|
| 4,059,280 A | 11/1977 | Eastwood |
| 4,113,268 A | 9/1978 | Simmons et al. |
| 4,192,520 A | 3/1980 | Hasegawa |
| 4,345,739 A | 8/1982 | Wheatley |
| 4,625,978 A | 12/1986 | Jelinek |
| 4,744,572 A | 5/1988 | Sahba et al. |
| 4,776,599 A | 10/1988 | Vezirian |
| 4,828,274 A | 5/1989 | Stannard |
| 4,874,009 A | 10/1989 | Pickerrell et al. |
| 5,127,661 A | 7/1992 | Franson et al. |
| 5,482,297 A | 1/1996 | Burns et al. |
| 5,490,680 A | 2/1996 | Patel et al. |
| 5,511,518 A | 4/1996 | Jain et al. |
| 5,564,177 A | 10/1996 | Fernandes et al. |
| 5,579,718 A | 12/1996 | Freerks |
| 5,692,758 A | 12/1997 | Wikström |
| 5,797,603 A | 8/1998 | Voirol et al. |
| 5,873,576 A | 2/1999 | Dietle et al. |
| 6,075,205 A | 6/2000 | Zhang |
| 6,315,302 B1 | 11/2001 | Conroy et al. |
| 6,328,316 B1 | 12/2001 | Fukuhara et al. |
| 6,523,833 B1 | 2/2003 | Ishigaki et al. |
| 6,561,522 B1 | 5/2003 | Radelet et al. |
| 6,676,131 B1 | 1/2004 | Hedin |
| 6,769,699 B2 | 8/2004 | Seki et al. |
| 7,063,329 B2 | 6/2006 | Anderson et al. |
| 7,306,237 B2 | 12/2007 | Tsuji et al. |
| 2008/0191474 A1 | 8/2008 | Kotz |
| 2009/0206558 A1 | 8/2009 | Nameki |
| 2012/0043331 A1 | 2/2012 | Nameki et al. |
| 2012/0223521 A1 | 9/2012 | Kotz |

OTHER PUBLICATIONS

Technical Information of Kalrez® TriLobe™ Seal (Jun. 2004) (2 pages).
Technical Information of Semiconductor Applications and Product Selector Guide (Jun. 8, 2006) (4 pages).
SAE J515 Surface Vehicle Standard (Dec. 2001) (2 pages).
SAE J515 Revised (Dec. 2001) (18 pages).
SAE J1453 Surface Vehicle Standard (Jun. 2002) (42 pages).
SAE J1453-1 Surface Vehicle Standard (Feb. 2007) (40 pages).
SAE J1453-2 Surface Vehicle Recommended Practice (Feb. 2007) (75 pages).
SAE J1453-3 Surface Vehicle Standard (Feb. 2007) (70 pages).
Prior Art Designs (8 pages).

\* cited by examiner

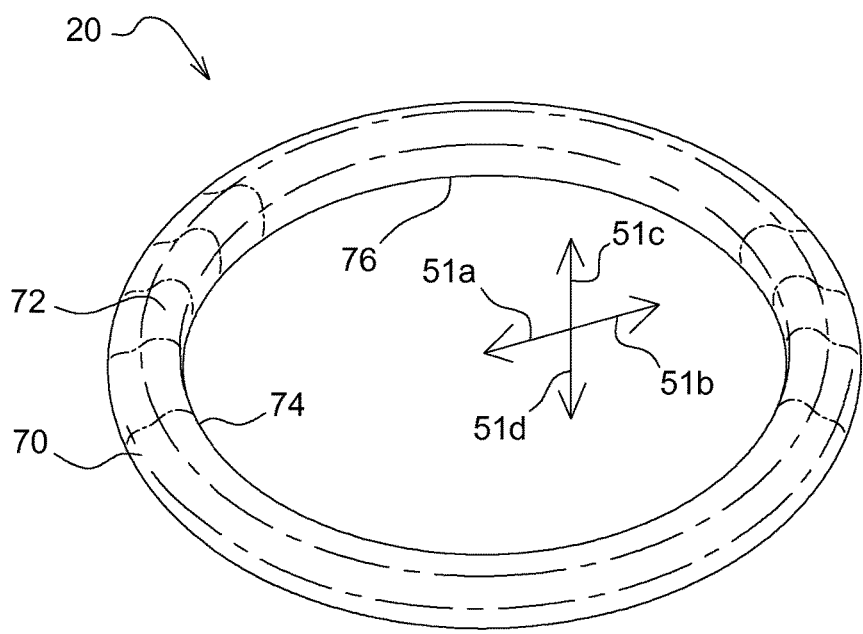
FIG. 3
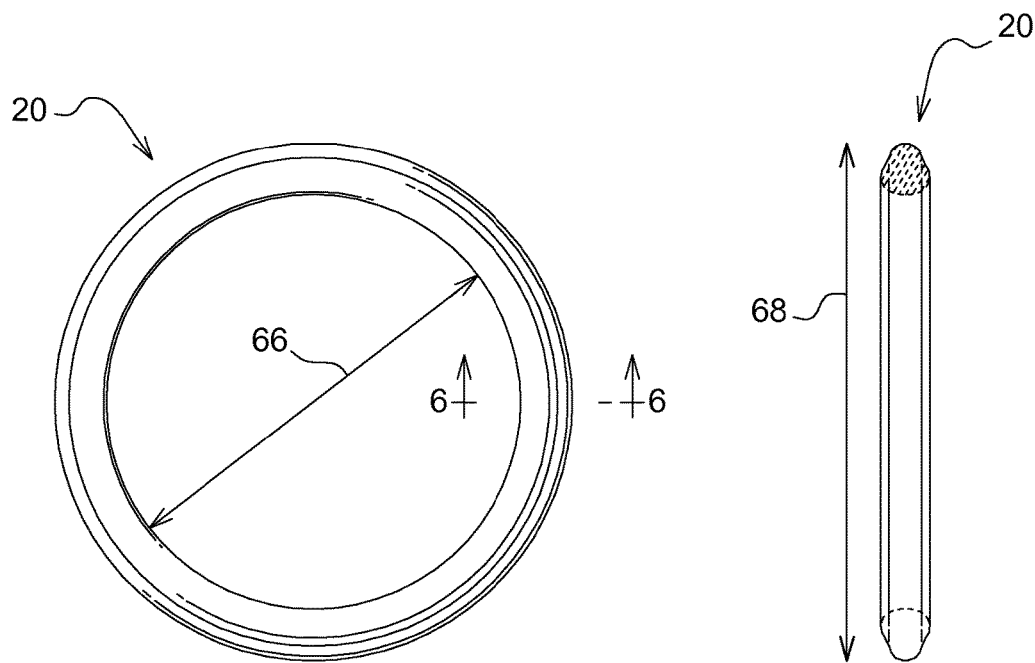
FIG. 4
FIG. 5

FLUID CONNECTOR WITH ANNULAR GROOVE AND SEAL

TECHNICAL FIELD

The present disclosure generally relates to a seal. An embodiment of the present disclosure relates to a fluid connector with an annular groove and an annular seal.

BACKGROUND

Fluid systems, such as hydraulic or pneumatic systems, may include connectors between components, such as hoses, pipes, manifolds, valves, pumps, reservoirs, and accumulators. These fluid connectors may utilize an annular seal to prevent leakage or contamination at the fluid connector. As an example, a fluid connector may utilize a face seal connection where an annular seal is held in compression between two surfaces, one on each of the interconnecting components, to form a seal.

Certain face seal connections may utilize an o-ring seal, an annular seal with a circular cross-section, installed in a groove on one of the two surfaces to be sealed. Installing the o-ring in a groove may provide for the proper positioning of the o-ring during the compression of the face seal connection, and may also help to retain the o-ring seal with one of the interconnecting components when the face seal connection is disconnected (unfastened) and not under compression. However, this arrangement of o-ring and groove may result in the seal being too loose or tight in the groove, which can result in the o-ring falling out of the groove and being lost or misplaced, the face seal connection leaking, or the o-ring being damaged upon compression.

SUMMARY

Various aspects of examples of the present disclosure are set out in the claims.

According to an aspect of the present disclosure, a fluid connector may include an inner face, an outer face, an annular groove, and an annular elastomeric seal. The annular groove may be positioned radially outward of the inner face and radially inward of the outer face. The groove may extend below the inner face and the outer face. The groove may include an inner wall between the inner face and a bottom wall, the bottom wall may be between the inner wall and an outer wall, and the outer wall may be between the bottom wall and a lip with the outer wall substantially parallel to the inner wall, and the lip may be between the outer wall and the outer face and protruding radially inward beyond at least a portion of the outer wall. The annular elastomeric seal may be installed in the groove and, in an undeformed state, include a first surface, a second surface, a third surface, and a fourth surface. The first surface may be convex. The second surface may be concave. The second surface may be between the first surface and a third surface. The second surface may be positioned radially inward of the first surface and radially outward of the third surface. The third surface may be convex. The third surface may be between the second surface and a fourth surface. Third surface may be positioned radially inward of the first surface. The fourth surface may be concave. The fourth surface may be between the third surface and the first surface. The fourth surface may be positioned radially outward of the third surface and radially inward of the first surface.

According to another aspect of the present disclosure, the groove may conform to the dimensional requirements of a standard half-dovetail groove in SAE J1453-1.

According to another aspect of the present disclosure, when the seal is in an undeformed state, the first surface may be the radially outermost portion of the seal and define an outer diameter of the seal and the third surface may be the radially innermost portion of the seal and define an inner diameter of the seal.

According to another aspect of the present disclosure, a cross-section of the undeformed seal may be substantially symmetric about an axis bisecting the first surface and the third surface.

According to another aspect of the present disclosure, for a cross-section of the undeformed seal, an average radius of each of the second surface and the fourth surface may be between 80% and 120% of an average radius of the first surface and an average radius of the third surface may be greater than 120% of the average radius of the first surface.

According to another aspect of the present disclosure, for a cross-section of the undeformed seal, a radius of each of the second surface and the fourth surface may be between 80% and 120% of a radius of the first surface, and a radius of the third surface may be at least double the radius of the first surface.

According to another aspect of the present disclosure, for a cross-section of the undeformed seal, the first surface, the second surface, and the fourth surface may each be circular arcs having a first radius.

According to another aspect of the present disclosure, the third surface may include a first portion, a second portion, and a third portion. The first portion may be convex and between the second surface and a second portion. The second portion may be convex and between the first portion and a third portion. The third portion may be convex and between the second portion and the fourth surface. For a cross-section of the seal, a radius of the first portion may equal a radius of the third portion, and a radius of the second portion may be greater than the radius of the first portion.

According to another aspect of the present disclosure, the outer diameter of the seal may be greater than an inner diameter of the lip.

According to another aspect of the present disclosure, contact between the seal and the lip may deform the first surface downward relative to the axis when the seal is installed in the groove.

According to another aspect of the present disclosure, the lip may retain the seal in the groove when the seal is installed in the groove.

According to another aspect of the present disclosure, the outer diameter of the seal may be substantially the same as a diameter of the outer wall.

According to another aspect of the present disclosure, the inner diameter of the seal may be greater than a diameter of the inner wall.

According to another aspect of the present disclosure, no portion of the seal may make contact with the inner wall when the seal is installed in the groove.

According to another aspect of the present disclosure, the fluid connector may be included in a fluid joint which also comprises a mating fluid connector. The mating fluid connector may include an opposing face facing at least one of the inner face and the outer face when the fluid joint is in a fastened position. The seal may be compressed between the bottom wall and the opposing face when the fluid joint is in the fastened position.

According to another aspect of the present disclosure, a fluid joint may include a first fluid connector and a second fluid connector. The first fluid connector may include a first face, an annular groove, and an annular elastomeric seal. The annular groove may be defined by an inner wall perpendicular to the first face, a bottom wall parallel to and below the first face, an outer wall parallel to and radially outward of the inner wall, and a lip positioned at the top of the outer wall and projecting radially inward from the outer wall. The annular elastomeric seal may include, in an undeformed state, an inner convex surface forming the radially innermost portion of the seal, an outer convex surface forming the radially outermost portion of the seal, a first concave surface interconnecting the inner convex surface and the outer convex surface and positioned on a first side of the seal, and a second concave surface interconnecting the inner convex surface and the outer convex surface and positioned on a second side of the seal opposite the first side. The seal may be symmetrical about a plane bisecting the inner convex surface and the outer convex surface and defining the first side and the second side of the seal. The second fluid connector may include a second face. The seal may be installed in the groove with the lip retaining the outer convex surface in the groove. The seal may be compressed by contact between its first side and the bottom wall and contact between its second side and the second face when the fluid joint is in a fastened position. The first fluid connector may be fastened to the second fluid connector via threads when the fluid joint is in the fastened position.

According to another aspect of the present disclosure, a cross-section of the outer convex surface may form a circular arc with a first radius, a cross-section of the first concave surface may form a circular arc with a second radius, and a cross-section of the second concave surface may form a circular arc with a third radius. The second radius and third radius may each be between 80% and 120% of the first radius.

According to another aspect of the present disclosure, a method of fastening a fluid joint may include positioning a first face of a first fluid connector opposite a second face of a second fluid connector, moving the first face and the second face toward each other until a threaded surface on first fluid connector can engage a threaded surface on the second fluid connector, fastening the threaded surface on the first fluid connector to the threaded surface on the second fluid connector at least until the second face makes contact with a seal, the seal installed in a groove of the first fluid connector, the groove defined by an inner wall extending between the first face and a bottom wall parallel with the first face, an outer wall substantially parallel with the inner wall and extending from the bottom wall to a lip, and a lip positioned at the opposite end of the outer wall as the bottom wall, and continuing to fasten the threaded surface until the seal is compressed between the second face and the bottom wall, the seal comprising, in an undeformed state, an outer convex surface defining an outer diameter of the seal greater than an inner diameter of the lip, an inner convex surface defining an inner diameter of the seal, a first concave surface between the inner convex surface and the outer convex surface on a first side of the seal, and a second concave surface between the inner convex surface and the outer convex surface on a second side of the seal opposite the first side.

According to another aspect of the present disclosure, the seal may be installed in the groove by placing the undeformed seal above the groove and exerting a downward force on the seal to deform the seal and move it downward until the outer convex surface is below the lip and deformed by the lip so as to retain the seal in the groove.

According to another aspect of the present disclosure, the seal may be installed by exerting a downward force on the seal until the entirety of the outer convex surface is below the lip.

The above and other features will become apparent from the following description and accompanying drawings.

BRIEF DESCRIPTION OF THE DRAWINGS

The detailed description of the drawings refers to the accompanying figures in which:

FIG. 3 is a perspective view of the seal, with the seal in an undeformed state;

FIG. 4 is a top view of the undeformed seal;

FIG. 5 is a side view of the undeformed seal;

Like reference numerals are used to indicate like elements throughout the several figures.

DETAILED DESCRIPTION

Figure 1:
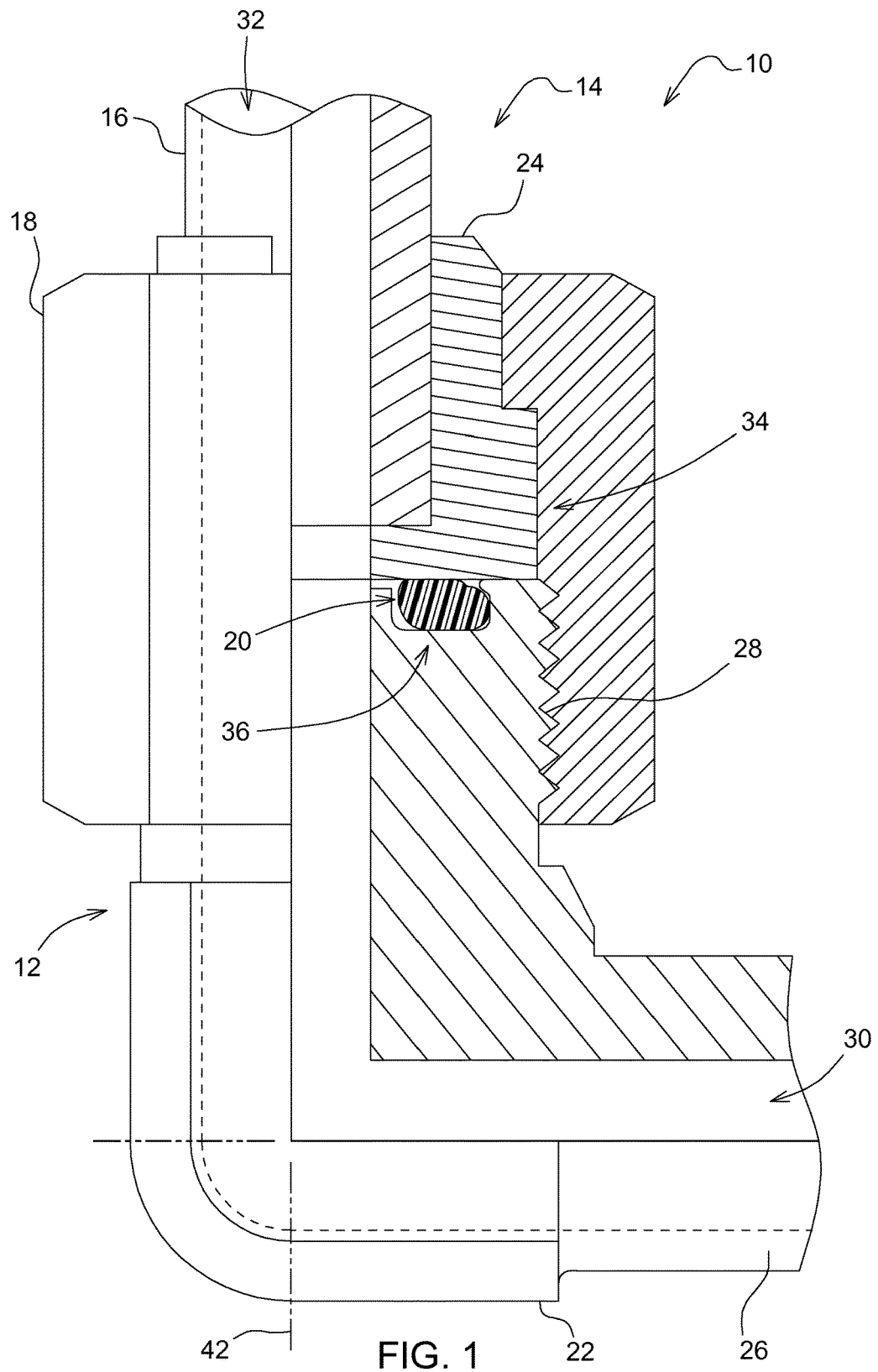
FIG. 1 is a partial cutaway view of a fluid joint, including a first fluid connector with a groove and a seal installed in the groove, and a second fluid connector fastened to the first fluid connector.

FIG. 1 illustrates a fluid joint 10, which includes a first fluid connector 12 fastened to a second fluid connector 14 so as to create a fluid seal that may allow fluid to flow through the fluid joint 10 without leaking. The first connector 12 is a fitting joined to an end of a tube 26, the tube 26 having an inner bore 30 configured to transport a fluid such as hydraulic fluid, oil, water, or air. The first connector 12 is illustrated as an angled connector which includes an elbow portion 22 which turns fluid flowing in a first direction within inner bore 30 approximately ninety degrees to flow in the direction of an axis 42. The second connector 14 is a fitting joined to an end of a rigid tube 16, the tube 16 having an inner bore 32 configured to transport fluid. The second connector 14 is illustrated as a straight connector and includes a sleeve 24 and a fastener, nut 18. The first connector 12 may also be referred to as a male connector while the second connector 14 may also be referred to as a female connector.

A seal 20 provides a fluid face seal between a mating end 36 of the first connector 12 and a mating end 34 of the second connector 14. The first connector 12 may be joined to the second connector 14 via interlocking threads located on an outer surface of the mating end 36 of the first connector 12 and an inner surface of the nut 18 of the second connector 14. These interlocking threads draw the second connector 14 toward the first connector 12 approximately along the axis 42 as the nut 18 is turned, or rotated relative to the mating end 36 of the first connector 12, allowing the second connector 14 to be secured or fastened to the first connector 12. The first connector 12 may alternatively engage the second connector 14 via other means, such as an alternate threaded fastening, clamping, or locking arrangement. When the second connector 14 is fastened to the first connector 12, a position at which the fluid joint 10 may be referred to as joined, fastened, or closed, the seal 20 is compressed and provides an annular seal surrounding the inner bore 30 and the inner bore 32. Other configurations of fluid joint 10 may also be provided.

The fluid joint 10 is configured to provide a sealed fluid connection, for example for a hydraulic or pneumatic fluid system. As illustrated, an interior portion or inner bore 30 extending through tube 26 is in fluid communication with an interior portion or inner bore 32 of tube 16. The seal 20 cooperates with the second connector 14 to provide an annular fluid seal surrounding these inner bores. Fluid joint 10 may be used in a fluid system for construction or agricultural equipment, such as a hydraulic system of an articulated dump truck, backhoe loader, compact track loader, crawler (e.g., crawler dozer, crawler loader), excavator, feller buncher, forwarder, harvester, knuckleboom loader, motor grader, scraper, skidder, sprayer, skid steer, tractor, tractor loader, and wheel loader. Fluid joint 10 may also be used in hydraulic systems for other vehicles, industrial equipment, or other suitable applications.

Figure 2:
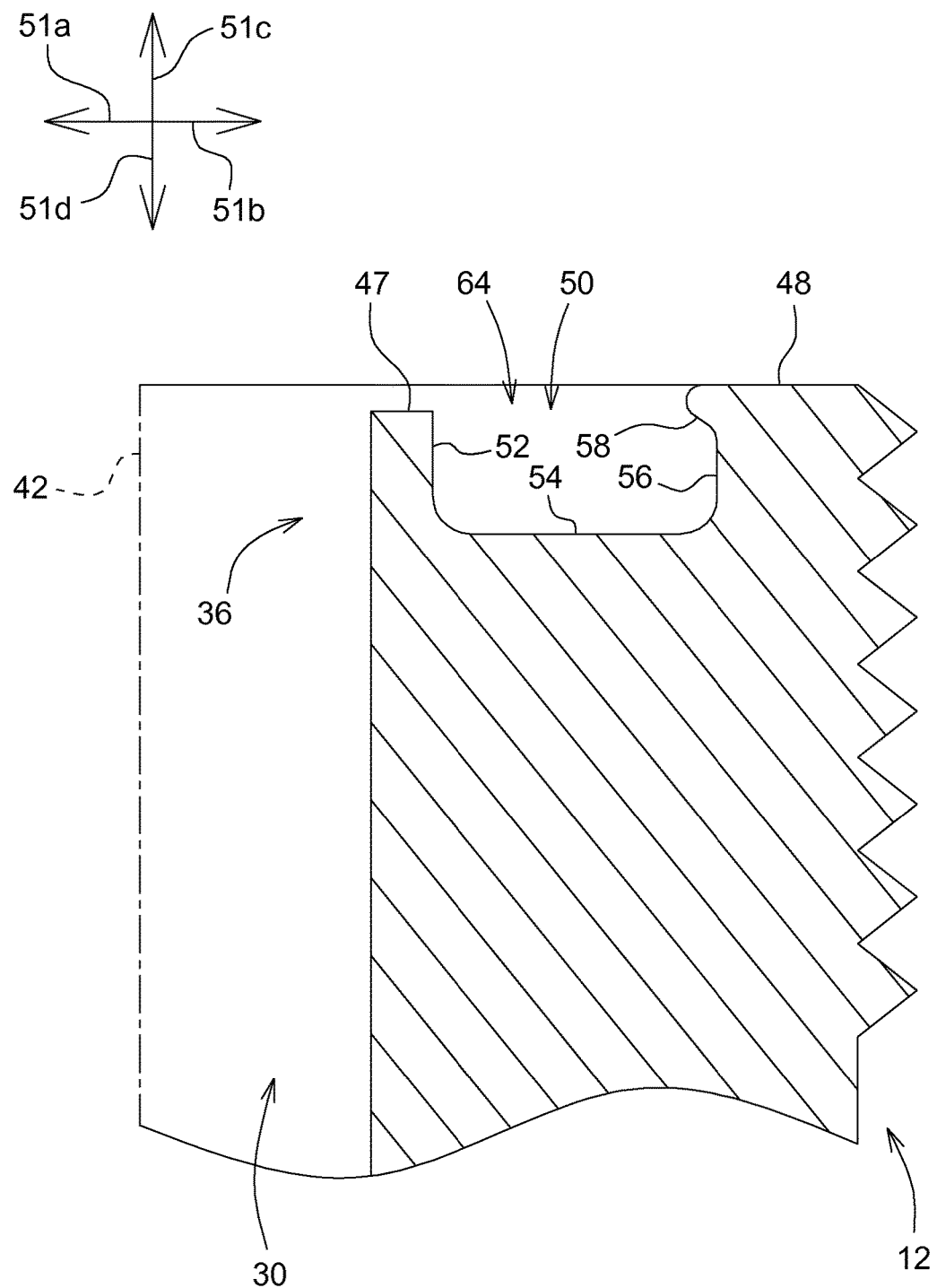
FIG. 2 is a cutaway view of the groove of the first fluid connector.

FIG. 2 illustrates a cross-section view of a portion of the first connector 12, specifically a portion containing an annular groove 50 at a mating end 36 of the first connector 12. The direction toward the axis 42 may be referred to as a radially inward direction 51a, the direction away from the axis 42 may be referred to as a radially outward direction 51b, the direction toward the mating second connector 14 may be referred to as an upward direction 51c (or above or top), and the direction away from the mating connector 14 and towards elbow portion 22 may be referred to as a downward direction 51d (or below or bottom).

The groove 50 is annularly positioned between an inner face 47 and an outer face 48, and extends below both faces. The groove 50 is defined by a mouth or opening 64, an inner wall 52, a bottom wall 54, an outer wall 56, and a lip 58. The inner wall is between the inner face 47 and the bottom wall 54. The bottom wall 54 is between the inner wall 52 and the outer wall 56. The outer wall 56 is between the bottom wall 54 and the lip 58. The lip 58 is between the outer wall 56 and the outer face 48, and projects radially inward relative to the outer wall 56. The lip 58 is positioned at an opposite end of the outer wall 56 as the bottom wall 54. The bottom wall 54 is configured to provide a seat for the seal 20 and a surface against which the seal 20 may be compressed to provide a fluid seal.

In the illustrated embodiment, each of the inner wall 52, bottom wall 54, and outer wall 56 is substantially flat and the three walls are interconnected by fillets. The bottom wall 54 is substantially parallel to the inner face 47 and the outer face 48 of the first connector 12, and substantially perpendicular to the axis 42. The inner wall 52 and the outer wall 56 are each substantially parallel to each other and the axis 42, and substantially perpendicular to the bottom wall 54, the inner face 47, and the outer face 48. In this context, substantially flat, parallel, and perpendicular are intended to convey flatness, parallelism, and perpendicularity within typical manufacturing tolerances for fluid connectors. In specific applications, this may be a flatness tolerance of 0.1 millimeters and parallelism or perpendicularity within 2.5 degrees. In alternate embodiments, the inner wall 52 and the outer wall 56 may be at an angle with respect to the bottom wall 54, or in yet other alternate embodiments they may also be at an angle with respect to each other such as in a groove complying with ISO 8434-3. In the embodiment shown in FIG. 2, the groove 50 may be designed so as to comply with the dimensional requirements of the half-dovetail standard groove SAE J1453-1 as of the time that this patent application was filed.

FIG. 3, FIG. 4, and FIG. 5 illustrate the seal 20 in greater detail. The seal 20 is annular in shape, and may also be referred to as a toroid, with an inner diameter 66 and an outer diameter 68. The seal 20 may be a continuous piece of an elastomeric material suitable for use as a fluid seal, such as butyl, ethylene-propylene, fluorocarbon, fluorosilicone, natural rubber, nitrile, perfluoroelastomer, polyethylene, silicone, and styrene-butadiene to name but a few choices. As an elastomeric material, the seal 20 may be deformed to a degree without damaging it. These three figures illustrate the seal 20 is an undeformed state, or the state the seal 20 may take on when it is not subject to an external force, and the accompanying description is that of the seal 20 is an undeformed state.

The seal 20 is comprised of a first surface 70, a second surface 72, a third surface 74, and a fourth surface 76. The first surface 70, which may also be referred to as an outer surface, is a convex surface that is the radially outermost surface of the seal 20. As the radially outermost surface of the seal 20, the first surface 70 defines the outer diameter 68 of the seal 20. Adjacent to the first surface 70 is the concave second surface 72, which may also be referred to as an upper surface. Adjacent to the second surface 72 is the third surface 74, which may also be referred to as an inner surface, a convex surface that is the radially innermost surface of the seal 20. As the radially innermost surface of the seal 20, the third surface 74 defines the inner diameter 66 of the seal 20. Adjacent to the third surface 74 is the concave fourth surface 76, which may also be referred to as a lower surface. Adjacent to the fourth surface 76 is the first surface 70. In this embodiment, the first surface 70 extends between the fourth surface 76 and the second surface 72, the second surface 72 extends between the first surface 70 and the third surface 74, the third surface 74 extends between the second surface 72 and the fourth surface 76, and the fourth surface extends between the third surface 74 and the first surface 70.

Figure 6:
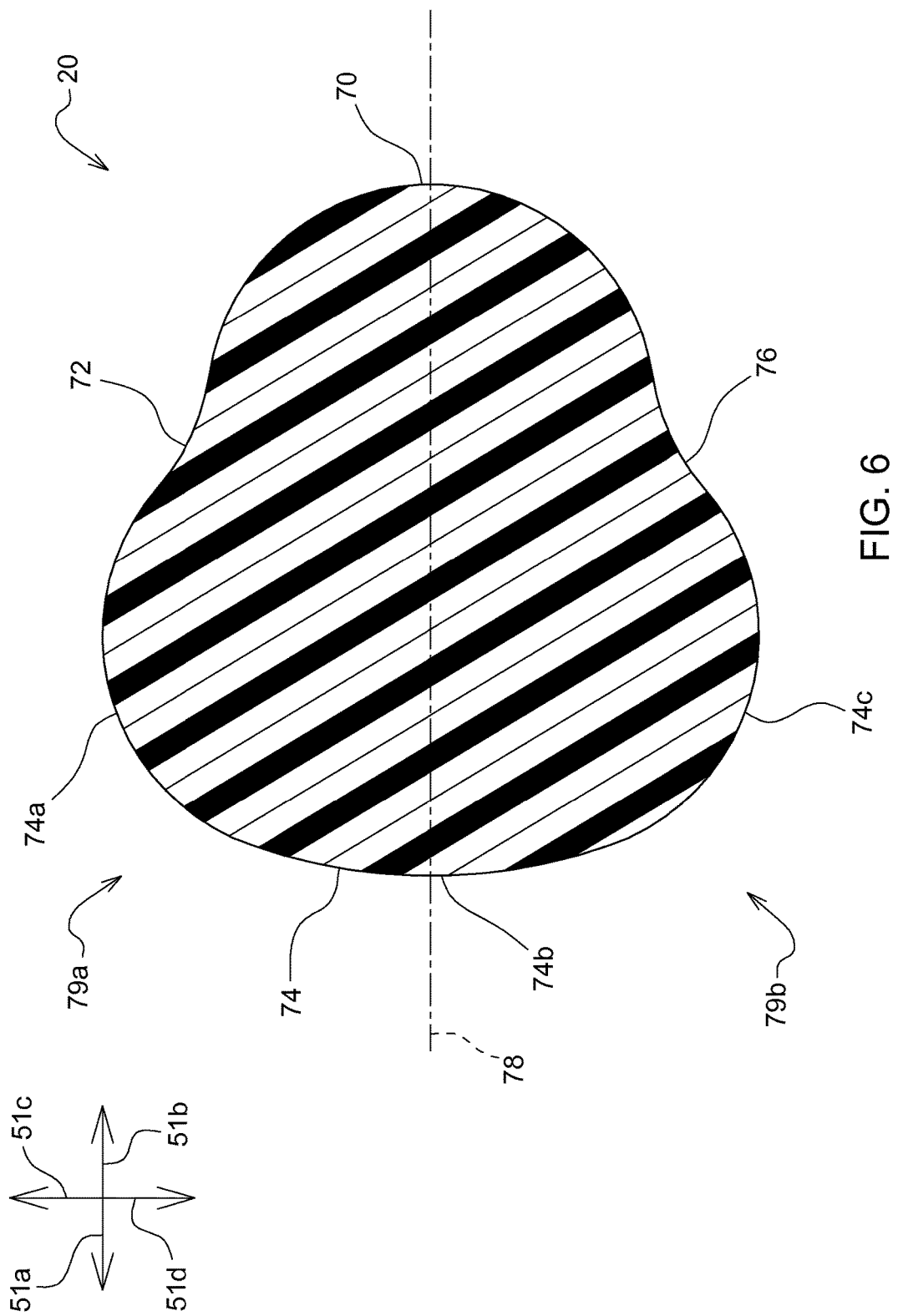
FIG. 6 is a cross-sectional view of the undeformed seal, taken along line 6-6 of FIG. 4.

FIG. 6 illustrates a cross-section of the seal 20, taken along the line 6-6 of FIG. 4. In this embodiment, the third surface 74 is comprised of a convex first portion 74a, a convex second portion 74b, and a convex third portion 74c, with the second portion 74b having a greater radius than either the first portion 74a or the third portion 74c. In this embodiment, the cross-section of the seal 20 is substantially symmetric about an axis 78 which bisects the first surface 70 and the third surface 74. The axis 78 bisects the seal 20 into a first side 79a on the upper side of the seal 20, and a second side 79b on the lower side of the seal 20. Due to its bilateral symmetry, the first side 79a is a mirror image of the second side 79b.

For the cross-section of the seal 20, the first surface 70, the second surface 72, the fourth surface 76, the first portion 74a, and the third portion 74c are each circular arcs of a first radius, while the second portion 74b is a circular arc of a second radius which is at least twice the magnitude of the first radius. In alternative embodiments, second portion 74b may be substantially flat instead of a circular arc. In this context, circular arc refers to an arc of a substantially constant radius, or a section of the circumference of a circle. Although these surfaces and portions may be referred to having a profile or cross-section of a circular arc, it is understood that there may be transitory regions between the surfaces which are not circular arcs.

In alternative embodiments, the radiuses of these surfaces and portions may not be equal, but may instead vary within a range. For example, for the cross-section of the seal 20, the radius of each of the second surface 72 and the fourth surface 76 may be between 80% and 120% of the radius of the first surface 70. The radius of the first portion 74a and the radius of the third portion 74c may also fall within this same range, while the radius of the second portion 74b may be at least double the radius of the first surface 70.

In other alternative embodiments, the cross-section of the seal 20 may not form surfaces and portions which are circular arcs, but may instead form alternative curves such as portions of a parabola, portions of an ellipse, or irregular curves which may have a radius which varies. In such alternative embodiments, the seal 20 may be configured so that the average radius of each of the first surface 70, the second surface 72, and the fourth surface 76 are equal. The average radius of the first portion 74a and the third portion 74c may also be equal, while the average radius of the second portion 74b may be at least double that of the first surface 70.

In other alternative embodiments, these radiuses and surfaces may not be circular arcs and the average radiuses may not be equal. In such alternative embodiments, the average radius of the second surface 72 and the fourth surface 76 may be between 80% and 120% of the average radius of the first surface 70, and the average radius of the first portion 74a and the third portion 74c may or may not fall within this range. In other such alternative embodiments, the average radius of these surfaces and portions may not fall within this range, but a radius of the second surface 72 and the fourth surface 76 may be between 80% and 120% of a radius of the first surface 70. A radius of the first portion 74a and a radius of the third portion 74c may also fall within this range, while a radius of the second portion 74b may be at least double a radius of the first surface 70.

Figure 7:
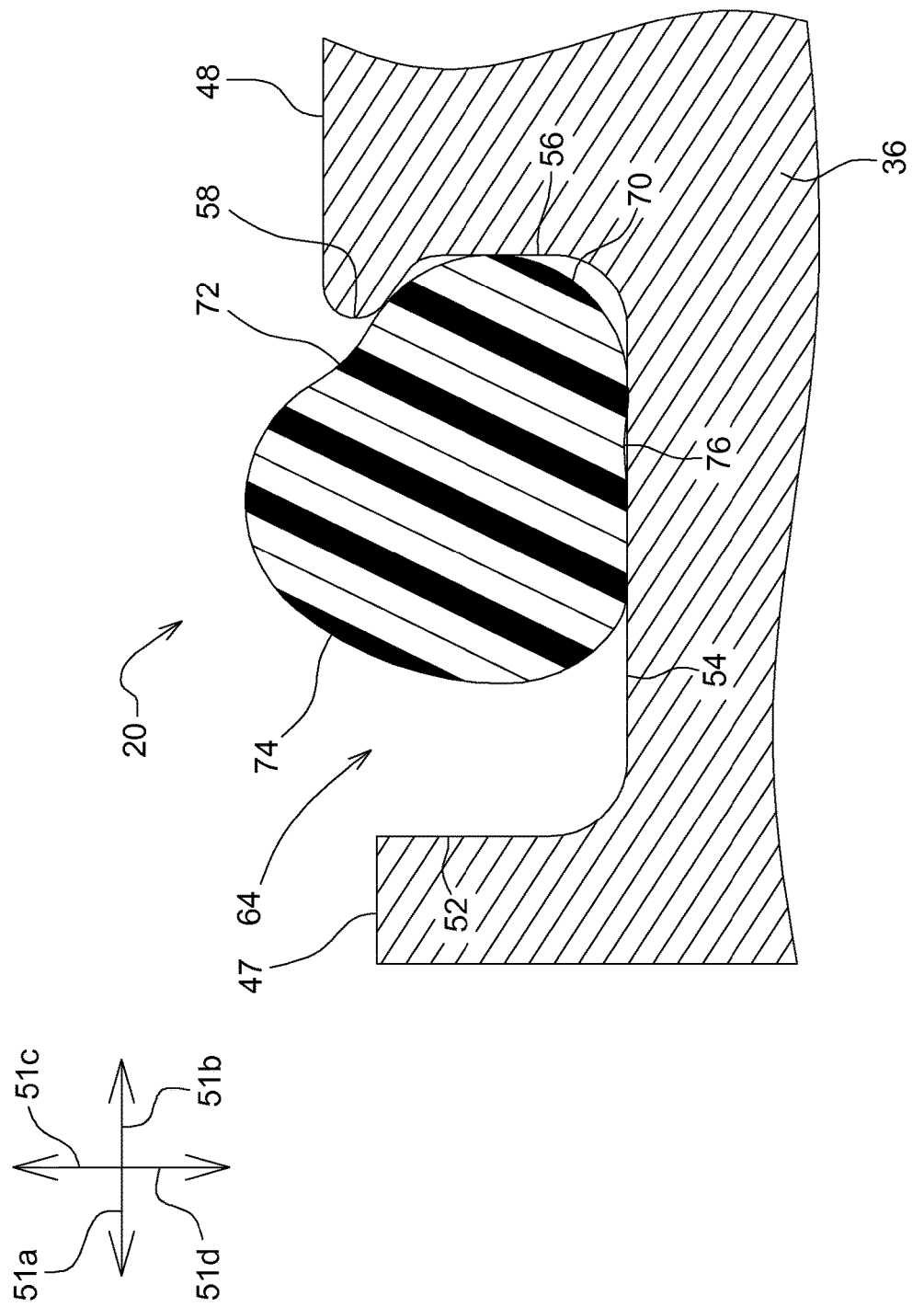
FIG. 7 is a cross-sectional view of the seal installed in the groove, the seal deformed into an installed state.

FIG. 7 illustrates the seal 20 installed within, or seated in, the groove 50. To install the seal 20 in the groove 50, the seal 20 may be placed above the groove 50 in an underformed state. The seal 20 may then be forced downward to deform the seal 20 such that the first surface 70 may pass by the lip 58. Once installed in the groove 50, the seal 20 remains deformed by its contact with the lip 58, which contacts the first surface 70 and deforms it downward relative to the axis 78. The seal 20 may also deformed by its contact with the outer wall 56, with which the first surface 70 may have an interference fit. In this way, the lip 58 helps retain the seal 20 in the groove 50 by blocking upward movement of the first surface 70. In alternative embodiments, the seal 20 may still be retaining in the groove 50 by the lip 58 but the seal 20 may be sized smaller such that it does not interfere with the lip 58 or the outer wall 56 when installed in the groove 50, but such that its outer diameter is still greater than the inner diameter of the lip 58.

The seal 20 may be dimensioned such that the outer diameter 68 is substantially the same as the diameter of the outer wall 56. In this context, it is sufficient if the outer diameter 68 is greater than the diameter of the most radially inward portion of the lip 58, but not so much greater that interference with the outer wall 56 makes it difficult to force the seal 20 into the groove 50. In the embodiment illustrated in FIG. 7, the outer diameter 68 is equal to the diameter of the outer wall 56, so as to create a line-on-line interference fit when the seal 20 is installed within the groove 50. This dimensioning of the seal 20 may have the technical effect of helping to secure the seal 20 in the groove 50, and keep it in place even when it is not being compressed by another fluid connector fastened to the first connector 12, such as fluid connector 14. For example, this may keep the seal 20 installed in the groove 50 when the second connector 14 is unfastened from the first connector 12, better enabling the seal 20 to stay with the first connector 12 until a fluid seal is required again. Other seal designs may be more liable to fall out of the groove 50 when the fluid joint 10 is unfastened, and may be lost and unavailable the next time the fluid joint 10 is fastened.

The seal 20 may also be dimensioned such that the difference between the outer diameter 68 and the inner diameter 66 is less than the difference between the innermost diameter of the lip 58 and the outermost diameter of the inner wall 52. This dimensioning may allow for easier installation of the seal 20 in the groove 50 by avoiding a situation where the thickness of the seal is significantly greater than the width of the mouth 64 of the groove 50.

Figure 8:
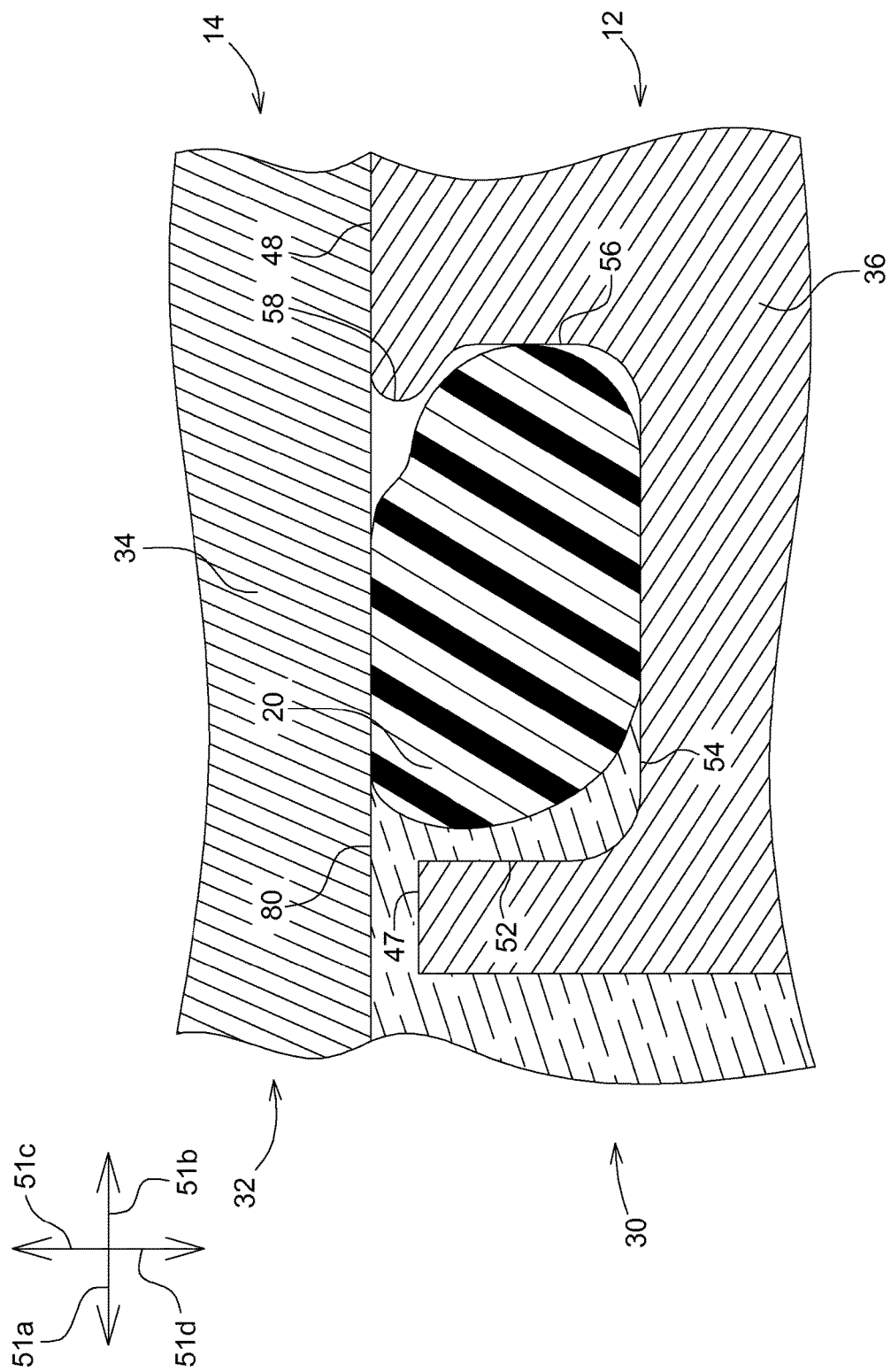
FIG. 8 is a cross-sectional view of the seal installed in the groove with the second fluid connector fastened to the first fluid connector, the seal deformed into a compressed state.

FIG. 8 illustrates a portion of the fluid joint 10, specifically the compression of the seal 20 between the bottom wall 54 of the first connector 12 and an opposing face 80 of the second connector 14 to form a face-seal arrangement. The opposing face 80 of the second connector 14 may be positioned opposite the outer face 48 of the first connector 12. As the second connector 14 is threaded onto the first connector 12, the opposing face 80 of the second connector 14 is brought into contact with the seal 20. The second connector may continue to be tightened until the opposing face 80 of the second connector 14 contacts the outer face of the first connector 12. This tightening will deform the seal 20, compressing it between the opposing face 80 and the bottom wall 54 so as to create a fluid seal preventing the fluid in the inner bore 30 of the first connector 12 and the inner bore 32 of the second connector 14 from traveling across the seal 20 and out between the opposing face 80 of the second connector 14 and the outer face 48 of the first connector 12.

While the present disclosure has been illustrated and described in detail in the drawings and foregoing description, such illustration and description is not restrictive in character, it being understood that illustrative embodiment (s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:
1. A fluid connector comprising:
   an inner face;
   an outer face;
   an annular groove positioned radially outward of the inner face and radially inward of the outer face, the groove extending below the inner face and the outer face, the groove comprising:
      an inner wall between the inner face and a bottom wall;
      the bottom wall between the inner wall and an outer wall;
      the outer wall between the bottom wall and a lip, the outer wall substantially parallel to the inner wall; and
      the lip between the outer wall and the outer face, the lip protruding radially inward beyond at least a portion of the outer wall; and
   an annular elastomeric seal installed in the groove, the seal, in an undeformed state, comprising:
      a first surface which is convex, the first surface forming a radially outermost portion of the seal;

a second surface which is concave, the second surface adjacent to the first surface and adjacent to a third surface, the second surface positioned radially inward of the first surface and radially outward of the third surface;

the third surface which is convex, the third surface adjacent to the second surface and adjacent to a fourth surface, the third surface forming a radially innermost portion of the seal; and the fourth surface which is concave, the fourth surface adjacent to the third surface and adjacent to the first surface, the fourth surface positioned radially outward of the third surface and radially inward of the first surface.

2. The fluid connector of claim 1, wherein the groove conforms to the dimensional requirements of a standard half-dovetail groove in SAE J1453-1.

3. The fluid connector of claim 1, wherein a cross-section of the undeformed seal is substantially symmetric about an axis bisecting the first surface and the third surface.

4. The fluid connector of claim 3, wherein, for the cross-section of the undeformed seal, an average radius of each of the second surface and the fourth surface is between 80% and 120% of an average radius of the first surface, and an average radius of the third surface is greater than 120% of the average radius of the first surface.

5. The fluid connector of claim 3, wherein, for the cross-section of the undeformed seal, a radius of each of the second surface and the fourth surface is between 80% and 120% of a radius of the first surface, and a radius of the third surface is at least double the radius of the first surface.

6. The fluid connector of claim 3, wherein, for the cross-section of the undeformed seal, the first surface, the second surface, and the fourth surface are each circular arcs having a first radius.

7. The fluid connector of claim 6, wherein the third surface comprises:
a first portion which is convex, the first portion between the second surface and a second portion;
a second portion which convex, the second portion between the first portion and a third portion; and
a third portion which is convex, the third portion between the second portion and the fourth surface;
wherein, for the cross-section of the seal, a radius of the first portion is equal to a radius of the third portion, and a radius of the second portion is greater than the radius of the first portion.

8. The fluid connector of claim 3, wherein the outer diameter of the seal is greater than an inner diameter of the lip.

9. The fluid connector of claim 8, wherein contact between the seal and the lip deforms the first surface downward relative to the axis when the seal is installed in the groove.

10. The fluid connector of claim 9, wherein the lip retains the seal in the groove when the seal is installed in the groove.

11. The fluid connector of claim 9, wherein the outer diameter of the seal is substantially the same as a diameter of the outer wall.

12. The fluid connector of claim 9, wherein the inner diameter of the seal is greater than a diameter of the inner wall.

13. The fluid connector of claim 12, wherein no portion of the seal makes contact with the inner wall when the seal is installed in the groove.

14. The fluid connector of claim 1, wherein the fluid connector is included in a fluid joint, the fluid joint also comprises a mating fluid connector, the mating fluid connector comprises an opposing face facing at least one of the inner face and the outer face when the fluid joint is in a fastened position, and the seal is compressed between the bottom wall and the opposing face when the fluid joint is in the fastened position.

15. The fluid connector of claim 1, wherein, when the seal is installed in the groove, a portion of the fourth surface contacts the bottom wall and forms a space between the fourth surface and the bottom wall.

16. A fluid joint comprising:
a first fluid connector comprising:
a first face;
an annular groove, the groove defined by an inner wall perpendicular to the first face, a bottom wall parallel to and below the first face, an outer wall parallel to and radially outward of the inner wall, and a lip positioned at the top of the outer wall and projecting radially inward from the outer wall; and
an annular elastomeric seal comprising, in an undeformed state, an inner convex surface forming the radially innermost portion of the seal, an outer convex surface forming the radially outermost portion of the seal, a first concave surface interconnecting the inner convex surface and the outer convex surface and positioned on a first side of the seal, and a second concave surface interconnecting the inner convex surface and the outer convex surface and positioned on a second side of the seal opposite the first side, the seal being symmetrical about a plane bisecting the inner convex surface and the outer convex surface and defining the first side and the second side of the seal; and
a second fluid connector comprising a second face;
wherein the seal is installed in the groove with the lip retaining the outer convex surface in the groove, the seal is compressed by contact between its first side and the bottom wall and contact between its second side and the second face when the fluid joint is in a fastened position, the first fluid connector fastened to the second fluid connector via threads when the fluid joint is in the fastened position.

17. The fluid joint of claim 16, wherein a cross-section of the outer convex surface forms a circular arc with a first radius, a cross-section of the first concave surface forms a circular arc with a second radius, and a cross-section of the second concave surface forms a circular arc with a third radius, and the second radius and third radius are each between 80% and 120% of the first radius.

18. A method of fastening a fluid joint, the method comprising:
positioning a first face of a first fluid connector opposite a second face of a second fluid connector;
moving the first face and the second face toward each other until a threaded surface on first fluid connector can engage a threaded surface on the second fluid connector;
fastening the threaded surface on the first fluid connector to the threaded surface on the second fluid connector at least until the second face makes contact with a seal, the seal installed in a groove of the first fluid connector, the groove defined by an inner wall extending between the first face and a bottom wall parallel with the first face, an outer wall substantially parallel with the inner wall and extending from the bottom wall to a lip, and a lip positioned at the opposite end of the outer wall as the bottom wall; and continuing to fasten the threaded surface until the seal is compressed between the second face and the bottom wall, the seal comprising, in an undeformed state, an outer convex surface defining an outer diameter of the seal greater than an inner diameter of the lip, an inner convex surface defining an inner diameter of the seal, a first concave surface adjacent to the inner convex surface and adjacent to the outer convex surface on a first side of the seal, and a second concave surface adjacent to the inner convex surface and adjacent to the outer convex surface on a second side of the seal opposite the first side.

19. The method of claim 18, further comprising installing the seal in the groove by placing the undeformed seal above the groove and exerting a downward force on the seal to deform the seal and move it downward until the outer convex surface is below the lip and deformed by the lip so as to retain the seal in the groove.

20. The method of claim 19, further comprising exerting a downward force on the seal until the entirety of the outer convex surface is below the lip.

\* \* \* \* \*